United States Patent [19]

Egli et al.

[11] 4,062,697

[45] Dec. 13, 1977

[54] METHOD AND APPARATUS FOR COUNTERCURRENT WASHING OF PARTICULATE SOLIDS

[75] Inventors: Walter Egli; Otto Douglas Erlandson, both of San Diego, Calif.

[73] Assignee: General Atomic Company, San Diego, Calif.

[21] Appl. No.: 755,644

[22] Filed: Dec. 30, 1976

[51] Int. Cl.$^2$ .............................................. B08B 3/04
[52] U.S. Cl. ................... 134/10; 134/25 R; 134/60; 134/103
[58] Field of Search .................. 134/10, 25 R, 60, 98, 134/101, 103; 8/158; 68/181 R; 176/37; 23/283

[56] References Cited

U.S. PATENT DOCUMENTS

| | | | |
|---|---|---|---|
| 2,632,720 | 3/1953 | Perry | 134/25 R |
| 2,765,913 | 10/1956 | Weiss et al. | 134/25 R X |
| 3,119,721 | 1/1964 | Suares | 134/25 R |

Primary Examiner—Richard V. Fisher
Attorney, Agent, or Firm—Fitch, Even, Tabin & Luedeka

[57] ABSTRACT

A method and apparatus is described for the countercurrent washing of particulate solids, especially nuclear fuel particles, in a washing tower including a sequential series of washing sections each having a recirculation loop for drawing fluid from an upper portion of the washing section and introducing it adjacent a restricted opening in the bottom of the same washing section in order to control the downward flow of solids from the section, an outlet section of the washing tower being arranged beneath the lowermost washing section and including a restricted passage for regulating flow of washing fluid in the washing tower, additional fluid being introduced into the outlet section of the tower in order to minimize the flow of washing solution through the restricted passage of the outlet section.

14 Claims, 2 Drawing Figures

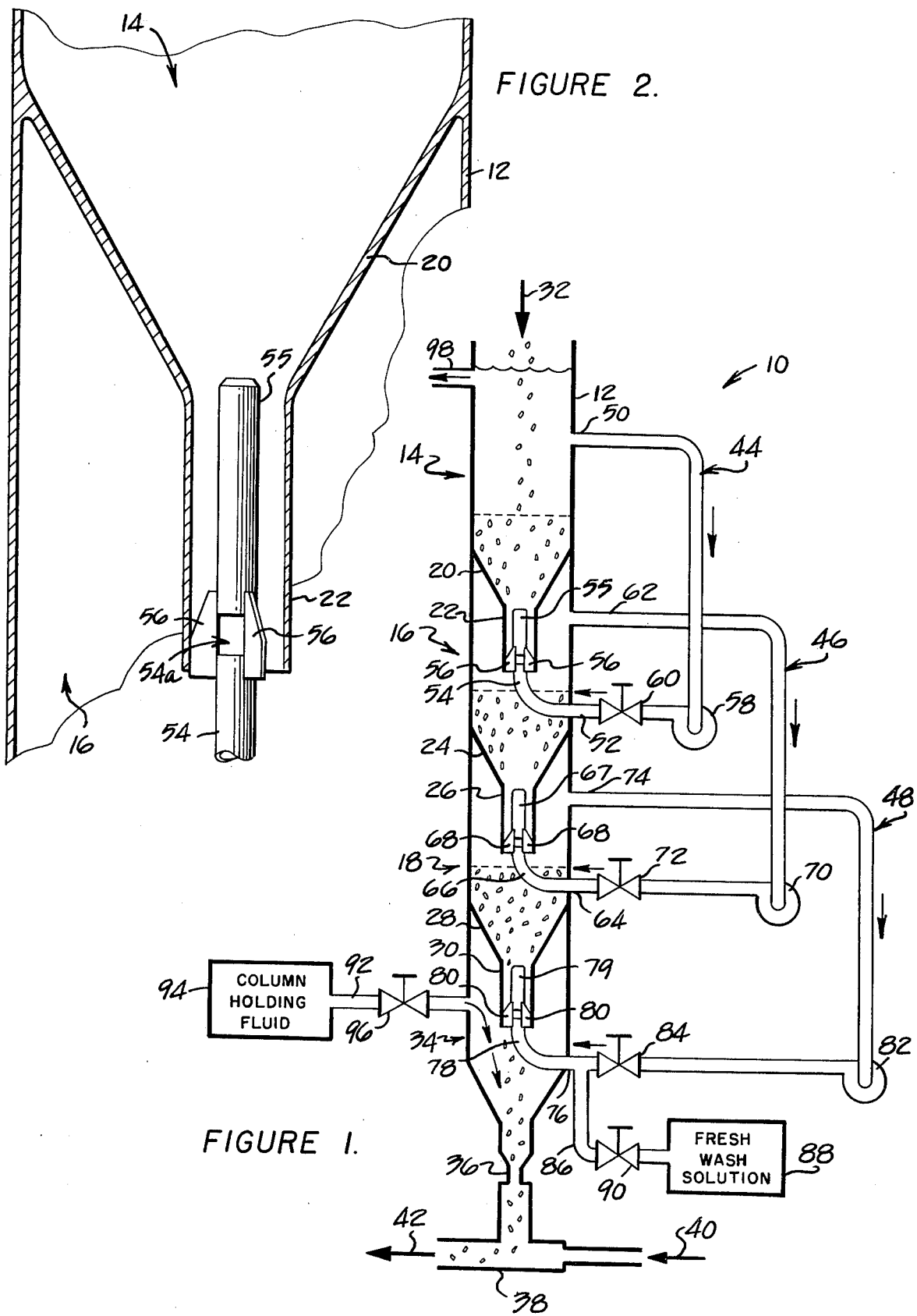

METHOD AND APPARATUS FOR COUNTERCURRENT WASHING OF PARTICULATE SOLIDS

BACKGROUND OF THE INVENTION

The present invention relates to a method and apparatus for carrying out the continuous countercurrent washing of particulate solids and more particularly to such a method and apparatus which is especially adapted for the continuous countercurrent washing of microspherical nuclear particles.

Continuous countercurrent washing has been commonly employed for washing particulate material such as finely divided solids in order to remove foreign materials. In the context of the present invention, such foreign material may be in any form, for example either a liquid or a solid, which may be dissolved or suspended or otherwise removed from the particulate solids by means of a suitable washing solution.

Within such continuous countercurrent washing processes, it is particularly important to remove the foreign material as completely as possible either for the purpose of recovering the particulate solids or possibly for the purpose of recovering the foreign material itself. In any event, continuous countercurrent washing has been found to be particularly effective for accomplishing the separation. However, various problems have been encountered in the operation of such continuous countercurrent systems. For example, it is particularly desirable to minimize the amount of washing solution employed during the washing process both to conserve the washing solution and to facilitate the removal from spent washing solution of material which is dissolved or otherwise suspended therein during the washing process. In addition, it has been found to be a problem to maintain the rate and duration of contact between the particulate solids and washing solution with the particulate solids first contacting relatively spent washing solution, then passing into contact with successively fresher gradations of the washing solution and finally contacting fresh washing solution just prior to exit of the washed particulate solids from the system.

The method and apparatus of continuous countercurrent washing as contemplated by the present invention is particularly adapted to the washing or cleansing of microspherical nuclear particles in order to remove from the nuclear particles any foreign material tending to remain in combination with the particles after their formation. For example, microspherical nuclear particles or kernels may be produced by a number of techniques.

One method for forming the microspherical nuclear particles is described in U.S. Pat. No. 3,957,933, issued May 18, 1976 to Walter Egli et al. and assigned to the assignee of the present invention. That patent describes a method and apparatus wherein a droplet generator dispenses uniform spherical droplets into a gelling column which contains gelling components to assist in the development of a final spherical configuration for the droplets. The spherical gelled particles from the process may then be dehydrated or otherwise treated under controlled conditions and sintered to develop high density prior to their being coated with a refractory material such as pyrolytic carbon. However, after undergoing this process, the microspherical particles contain ammonium nitrate and remain in the particles after they have been permanently formed into a spherical configuration. Accordingly, it is necessary to remove essentially all of the ammonium nitrate from the nuclear particles before further processing.

In any event, the method and apparatus of the present invention have been found to be particularly effective in the continuous countercurrent washing of particulate solids such as the microspherical nuclear particles described above for a number of reasons discussed in greater detail below.

SUMMARY OF THE INVENTION

Accordingly, it is an object of the present invention to provide a method and apparatus for the continuous countercurrent washing of particulate solids in a washing tower comprising a plurality of washing sections, each section including means for withdrawing washing solution from an upper portion of the washing section and recirculating it at a regulated rate into the bottom of the respective washing section through a restricted opening at the base of the respective washing section, washed particulate solids from the lowermost washing section being received in an outlet section including a restricted passage for regulating the flow of washing solution up or down in the tower.

It is a more particular object of the invention to provide such a method and apparatus wherein additional fluid is introduced into the outlet section of the tower in order to minimize the loss of washing solution from the tower.

It is yet another object of the invention to provide such a method and apparatus especially for the washing of microspherical nuclear particles. The present invention has been found to be particularly effective in this application due initially to the requirement for removing essentially all foreign material from the nuclear particles or kernels prior to their being further processed for use in nuclear reactors, for example. In addition, it is particularly important to minimize the amount of wash solution employed for cleaning the nuclear particles since the spent washing solution typically contains radioactive material and thus requires substantial additional processing before it can be released from the washing operation or recycled as fresh wash solution. Still further, it is desirable that the washing or cleansing of the nuclear particles be carried out by means which can be effectively automated or remotely controlled in order to minimize contact with the nuclear material.

Additional objects and advantages of the invention are made apparent in the following description having reference to the accompanying drawings.

BRIEF DESCRIPTION OF THE DRAWINGS

FIG. 1 is a schematic representation of a continuous, countercurrent multi-stage washing tower constructed in accordance with the present invention.

FIG. 2 is a fragmentary view, with parts in section, illustrating the construction at the base of each washing section in the tower of FIG. 1.

DESCRIPTION OF THE PREFERRED EMBODIMENT

Referring now to FIG. 1, a continuous, countercurrent multi-stage washing tower according to the present invention is indicated at 10 and includes a vertical tower 12 which is divided along its length into a plurality of separate washing sections, three of which are indicated at 14, 16 and 18. It may be seen in FIG. 1 that the washing section 14 is the uppermost section in the tower 12, the washing section 18 is the lowermost section in the tower and the washing section 16 is arranged intermediate of the sections 14 and 18.

Each of the washing sections 14, 16 and 18 is of substantially similar construction. Each washing section, for example that indicated at 14, is formed within the cylindrical tower 12 and includes a restricted opening at its base for communication either with an adjacent washing section or an outlet section in the case of the lowermost washing section 18. The restricted opening is preferably formed by a conically shaped floor 20 having a downwardly projecting cylindrical extension 22, the cylindrical extension 22 forming the restricted opening referred to above.

The intermediate washing section 16 has a similar conical floor 24 with a downwardly depending cylindrical extension 26. The lowermost washing section 18 also has a conical floor 28 and cylindrical extension 30.

The tower 12 also includes means for introducing particulate solids to be washed into the uppermost washing section 14. As illustrated in FIG. 1, the upper end of the washing section 14 is open to receive particulate solids as generally indicated at 32.

The lower end of the tower 12 forms an outlet section 34 for receiving washed solids from the lowermost washing section 18. The washed solids pass out of the tower from the outlet section 34 through a restrictive passage or orifice 36 along with a portion of the washing solution. The restrictive passage 36 is in communication with a conduit 38 adapted to also receive a flow of transport fluid generally indicated at 40. Particles from the restrictive passage 36 are suspended in the transport fluid 40 and carried through the conduit 38 for further processing. The transport fluid containing the washed particulate solids, as generally indicated at 42, may pass to further processing equipment. For example, where the washing tower is being employed for the washing of nuclear fuel particles, the particles may be carried by the transport fluid to a dryer in order to remove the transport fluid and any remaining washing solution from the particles.

Returning again to the washing tower, the washing sections 14, 16 and 18 include separate recirculation loops or conduits indicated respectively at 44, 46 and 48. The recirculation loop 44 has one end 50 in communication with an upper portion of the washing section 14 while its other end 52 penetrates through the tower structure 12 for communication with a nozzle 54 which projects upwardly into the restricted outlet opening formed by the cylindrical extension 22. A rod 55 is arranged within the cylindrical extension 22 and secured above the nozzle 54 to form a space 54a for dispersing recirculated solution from the nozzle and regulating its flow upwardly through the cylindrical extension 22 into the washing section 14. The nozzle 54 and the rod 55 are secured and positioned by a plurality of circumferentially arranged fins or spacers 56 which engage the cylindrical extension 22. The mounting of the nozzle 54 and rod 55 within the cylindrical extension 22 by means of the fins 56 may be better seen in FIG. 2.

The degree of agitation or fluidization within the washing section 14 may be adjusted, for example, by changing the flow velocity of the washing solution through the nozzle 54 or by varying the dimensions of the rod 55 or by adjusting the spacing between the rod 55 and nozzle 54.

The recirculation loop 44 also includes a pump 58 and an adjustable throttle valve 60 for drawing fluid from an upper end of the washing section 14 and introducing it into the washing section 14 through the cylindrical extension 22 by means of the nozzle 54. The nozzle 54 and rod 55, as described above, as well as the rate of recirculation established by the valve 60 serve to establish the dwell time for particulate solids within the first washing section 14. This function of the valve 60 is described in greater detail below.

The recirculation loop 46 for the second or intermediate washing section 16 similarly has one end 62 in communication with an upper portion of the washing section 16 while its other end 64 penetrates the tower housing 12 and communicates with a nozzle 66 supported within the cylindrical extension 26 along with a flow controlling rod 67 by means of fins or spacers 68. The recirculation loop 46 also includes a pump 70 and an adjustable throttle valve 72 for drawing fluid from the upper portion of the washing section 16 and introducing the recirculated fluid into the bottom of the washing section 16 through the nozzle 66.

The recirculation loop 48 for the lowermost washing section 18 also has one end 74 in communication with an upper portion of the washing section, its other end 76 penetrating the tower housing 12 and connecting with a nozzle 78 supported in centered relation within the cylindrical extension 30 along with a flow controlling rod 79 by means of spacers 80. The recirculation loop 48 also includes a pump 82 and adjustable throttle valve 84 for drawing the fluid from the upper end of the washing section 18 and recirculating it into the bottom of the washing section 18 through the nozzle 78.

A branched conduit 86 is in communication with the recirculation loop 48 between the throttle valve 84 and the nozzle 78. The branched conduit 86 is adapted to receive fresh washing solution from a source 88 at a rate determined by an adjustable throttle valve 90.

Another conduit 92 is also in communication with the outlet section 34 for communicating additional fluid from a source 94 into the tower above the restrictive passage 36 at a rate determined by another adjustable throttle valve 96. Fluid from the source 94 is introduced into the tower to establish the height of the fluid column within the tower and to minimize the flow of washing solution out of the tower through the restrictive passage 36 as will be discussed in greater detail below.

An overflow conduit 98 is in communication with the upper washing section 14 in order to remove spent washing solution from the tower. The manner of regulating the flow of spent washing solution through the tower and out the overflow conduit 98 is also described in greater detail below.

In operation, the washing sections 14, 16 and 18 of the tower 12 are filled with washing solution and particulate solids to be washed are introduced at the upper end of the tower. The particulate solids pass downwardly through the successive washing sections, the dwell time for the particles in each section being determined by the size of the respective outlet openings in the cylindrical extensions 22, 26 and 30 and the rate at which fluid is recirculated through the nozzles 54, 66 and 78 by the respective recirculation loops. The washed solids from the lowermost washing section 18 pass downwardly through the outlet section 34 and the restrictive passage 36 to be carried away from the washing tower through the conduit 38.

Preferably, additional fluid is introduced into the outlet section 34 of the tower at a rate tending to establish the fluid column height within the tower 12. The additional fluid flow from the source 94 also tends to reduce the flow of washing solution from the source 88 through the restrictive passage 36 and thus minimizes the amount of washing solution employed within the tower. With the flow of fluid from the source 94 establishing the height of the fluid column within the tower, the introduction of fresh washing solution from the source 88 and the flow of spent washing solution passing out of the upper end of the tower 12 through the overflow conduit 98 are both determined substantially by the throttle valve 90.

In a preferred method for initiating operation of the washing tower 10, the valve 96 is first opened to introduce fluid from the source 94 into the tower 12. The valve 96 is adjusted until fluids stands in the tower at a level just below the overflow conduit 98 and is then throttled back in order to maintain the fluid column at that height in the tower. During stable operation, substantially all of the fluid entering the tower through the valve 96 tends to pass out of the tower through the restrictive passage 36, the pressure drop through the restrictive passage 36 equaling the static liquid head formed by the fluid column within the tower 12.

The valve 90 is then adjusted to introduce fresh wash solution into the lowermost washing section 18 through the branched conduit 86 and the nozzle 78. The washing solution tends to disperse upwardly and effectively fill the three washing sections 14, 16 and 18. With the height of the fluid column in the tower 12 being established by the flow rate through the valve 96, the flow of fresh washing solution into the tower through the valve 90 is balanced by the flow of spent washing solution out of the tower through the overflow conduit 98, at least during equilibrium operation of the washing tower.

After sufficient time is allowed for the washing solution from the source 88 to circulate upwardly through all of the washing sections, the pumps 58, 70 and 82 are set in operation. The valves 60, 72 and 84 are then opened to recirculate fluid within each of the respective washing sections in the manner described above.

The washing tower is then in condition to receive particulate solids to be washed which, as noted above, are introduced into the top of the uppermost washing section 14. The solids pass downwardly through the successive washing sections, countercurrent to the upper flow of washing solution, and eventually pass through the outlet section 34 and restrictive passage 36 to exit the tower 12. The dwell time or average period of retention for the particles in each of the washing sections 14, 16 and 18 is determined by the relative sizing of the nozzle and flow controlling rod at the bottom of each washing section and the rate of fluid recirculation through the respective nozzles 54, 66 and 78. As was indicated above, fluid flow from each nozzle is directed upwardly into the respective washing sections and thus tends to restrict or selectively limit the countercurrent or downward passage of the particulate solids through the tower.

Preferably, in initial operation, the recirculation valves 60, 72 and 84 are fully opened so that substantially all of the particulate solids entering the tower 12 tend to collect in the uppermost washing section 14. After sufficient solids are collected in the washing section 14, the valve 60 is throttled back in order to allow the particles to pass downwardly into the intermediate washing section 16. Similarly, after sufficient solids are then collected in the intermediate washing section 16, the valve 72 is throttled back in order to allow the particles to pass downwardly into the lowermost washing section 18. Here again, after sufficient solids are collected in the lowermost washing section 18, the valve 84 is throttled back so that solids from the washing section 18 pass downwardly through the outlet section 34 and the restrictive passage 36 to be carried away from the washing tower by the transport fluid 40.

The washing operation described immediately above is preferably adapted to wash or purify microspherical nuclear particles or kernels of fertile thorium oxide which may contain residual ammonium nitrate, for example, as an impurity. In order to remove the ammonium nitrate, 3% ammonium hydroxide in water is introduced into the tower as the fresh washing solution from the source 88. The additional fluid introduced into the outlet section 34 of the tower through the valve 96 may be water or is preferably a more dilute 1% solution of ammonium hydroxide in water to accomplish the abovenoted functions of maintaining the column height in the tower and passing downwardly with the clean particulate solids through the restrictive passage 36. Similarly, the transport fluid 40 is also preferably a 1% solution of ammonium hydroxide. Within the preferred washing operation described above, the column holding fluid and the transport fluid contain ammonium hydroxide only for pH control to prevent deterioration of the particles.

A number of principal advantages are made possible by the design and operation of the washing tower system 10 described above. Initially, the system permits continuous flow of particulate solids downwardly through the tower with spent washing solution exiting the tower through the overflow conduit 98. As noted above, either the cleaned particulate solids or the overflow washing solution or both may be recovered from the tower. In addition, the contact time between the particulate solids and the washing solution may be readily adjusted within each of the washing stages even during operation by adjusting the respective valves 60, 72 and 84.

Washing efficiency may be adjusted by increasing or varying the number of washing stages in the tower and/or the relative countercurrent flow rates for washing solution and particulate solids through the tower.

The washing tower system 10 is particularly adapted for washing microspherical particles containing fertile material as was also noted above. However, the system is equally adaptable for washing other particulate solids. For example, fissile material such as uranium oxide or plutonium oxide particles, which tend to be heavier than the thorium oxide particles discussed above, may be cleaned in the tower by suitably adjusting the geometry and/or flow rates within the tower.

The arrangement of valves and controls for the system is particularly simple and permits the system to be adapted for automatic or remote control through the use of various sensing elements (not shown) for monitoring concentrations and other operating characteristics within the tower in order to permit stable operation of the washing system.

The manner of recirculating fluid within each of the washing sections and the introduction of additional fluid into the outlet section 34 permits the amount of washing solution used in the tower to be minimized. This is a particularly important feature of the invention since it minimizes the amount of spent washing solution to be processed after passage out of the tower. At the same time, the minimum flow of washing solution through the tower facilitates the recovery of components from the spent washing solution.

Additional advantages of the washing tower system 10 are believed obvious from the preceding description. Various modifications and design changes are obviously possible both in the design of the washing tower and its mode of operation. Accordingly, the scope of the present invention is defined only by the following claims.

What is claimed is:

1. A continuous, countercurrent washing unit for washing particulate solids with a washing solution, comprising
    a washing tower having means defining a plurality of washing sections disposed one above the other,
    each washing section of the tower including
        means defining a restricted opening at its base,
        a recirculation loop interconnected at one end with an upper portion of each washing section, the other end of the loop terminating adjacent the restricted opening in the base of each section, and
        a pump and throttle valve means arranged in each recirculation loop for drawing washing solution from the upper portion of each section and recirculating it upwardly into the bottom of the respective section through the restricted opening at a regulated rate to control passage of solids through the restricted opening,
    the washing unit further comprising,
    means in communication with the uppermost washing section for introducing particulate solids to be washed, and
    means for introducing washing solution into the lowermost washing section,
    the tower also comprising means defining an outlet section arranged beneath the lowermost washing section for receiving washed particulate solids therefrom, said outlet section including means defining a restricted passage for regulating the flow of washing solution in the tower.

2. The washing tower of claim 1 further comprising means for introducing additional washing solution into the washing tower above the restricted passage in the outlet section in order to minimize the flow of washing solution through the restricted passage of the outlet section with the particulate solids.

3. The washing tower of claim 2 further comprising an overflow means in communication with the uppermost washing section above the interconnection for the one end of the respective recirculation conduit and a flow regulating means for regulating the rate at which the additional washing solution is introduced into the outlet section of the tower above the restricted passage, the flow regulating means being adjustable to maintain the height of the washing solution column in the washing tower relative to the overflow means.

4. The washing tower of claim 1 wherein the recirculation loop for the lowermost washing section includes means for introducing fresh washing solution into the lowermost section along with the recirculated washing solution.

5. The washing tower of claim 1 further comprising overflow means in communication with an upper portion of the uppermost washing section.

6. The washing tower of claim 1 wherein the base of each washing section is formed by a conically shaped floor, the restricted opening being formed by a central portion of the conical floor, the other end of the respective recirculation loop comprising a nozzle outlet means extending upwardly through the central floor opening for each washing section.

7. The washing tower of claim 6 further comprising spacer means for positioning the nozzle relative to the restricted opening in the base of the washing section, a cylindrical element forming an extension of the restricted opening for receiving the nozzle and spacer means.

8. The washing tower of claim 1 wherein the other end of each respective recirculation loop is in communication with a nozzle outlet means extending upwardly through the restricted opening of the respective washing section.

9. A continuous countercurrent washing unit for washing particulate solids with a washing solution, wherein the particulate solids are microspherical particles containing fissile and/or fertile material, the washing solution being selected to remove foreign material from the microspherical particles, comprising
    means defining a washing tower including a plurality of washing sections disposed one above the other,
    each washing section of the tower including
        a tapered floor forming a centrally arranged restricted opening at the base of the respective washing section,
        a recirculation loop interconneted at one end with an upper portion of the respective washing section, the other end of the loop being in communication with a nozzle means extending upwardly through the restricted opening in the base of the respective section, and
        a pump and throttle valve means arranged in each respective recirculation loop for drawing washing solution from the upper portion of the section and recirculating it into the base of the section through the nozzle means,
    the recirculation loop for the lowermost washing section including means for introducing fresh washing solution into the lowermost washing section,
    the washing unit further comprising,
    means in communication with the uppermost washing section for introducing particulate solids to be washed,
    an outlet section arranged beneath the lowermost washing section for receiving washed solids therefore, said outlet section including a restricted passage means for regulating the flow of washing solution in the tower,
    overflow means in communication with an upper portion of an uppermost washing section, and
    means for introducing additional washing solution into the outlet section of the tower above the restricted passage in order to minimize the flow of washing solution from the tower through the restricted passage.

10. In a method of washing particulate solids to remove foreign material, the steps comprising,
    forming a washing tower with a plurality of washing sections arranged one above the other and an outlet section at the base of the tower, each washing section including a restricted opening at its lower end, introducing fresh washing solution into the washing tower beneath the restricted opening for the lowermost washing section, withdrawing washing solution from an upper portion of each washing section and recirculating said withdrawn washing solution for introduction through the restricted opening in the bottom of the respective washing section, regulating the rate of washing solution recirculation for each washing section in order to selectively adjust the dwell time for particulate solids in each respective washing section, and restricting passage of particulate solids from the outlet section of the wash tower in order to regulate the flow of washing solution in the tower.

11. The method of claim 10 further comprising the step of introducing additional washing solution into the outlet section of the washing tower for minimizing passage of the washing solution from the washing tower to the outlet section.

12. The method of claim 11 further comprising the step of withdrawing spent washing solution from the uppermost washing section of the tower and regulating the rate at which the additional washing soluion is introduced into the outlet section of the washing tower to maintain a washing solution column in the tower.

13. The method of claim 10 further comprising the step of receiving particulate solids from the outlet section of the washing tower in a suitable transport fluid.

14. The method of claim 10 wherein the particulate solids are microspherical particles containing fissile and/or fertile material and further comprising the step of selecting the washing solution to effectively remove foreign material for the microspherical particles.

* * * * *

UNITED STATES PATENT AND TRADEMARK OFFICE
CERTIFICATE OF CORRECTION

PATENT NO. : 4,062,697
DATED : December 13, 1977
INVENTOR(S) : Walter Egli and Otto Douglas Erlandson It is certified that error appears in the above-identified patent and that said Letters Patent are hereby corrected as shown below:

Claim 9
Column 8, line 52 "therefore" should be --therefrom--.

Signed and Sealed this

Thirtieth Day of May 1978

[SEAL]

Attest:

RUTH C. MASON
Attesting Officer

LUTRELLE F. PARKER
Acting Commissioner of Patents and Trademarks